(12) United States Patent
Kang et al.

(10) Patent No.: US 10,674,003 B1
(45) Date of Patent: Jun. 2, 2020

(54) APPARATUS AND SYSTEM FOR IDENTIFYING OCCUPANTS IN A VEHICLE

(71) Applicants: DENSO International America, Inc., Southfield, MI (US); Denso Corporation, Kariya (JP)

(72) Inventors: Te-Ping Kang, Ann Arbor, MI (US); Yu Zhang, Farmington Hills, MI (US); Bilal Alasry, Dearborn, MI (US); Vikas Upmanue, Novi, MI (US); Jordan Necovski, Livonia, MI (US); Sean Bleicher, Fenton, MI (US); Doua Vang, Waterford, MI (US); Eleanor Duke, Sterling Heights, MI (US); Nicholaus Spunar, Canton, MI (US)

(73) Assignees: DENSO INTERNATIONAL AMERICA, INC., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/370,017

(22) Filed: Mar. 29, 2019

(51) Int. Cl.
*H04M 3/00* (2006.01)
*H04M 1/725* (2006.01)
*H04N 7/14* (2006.01)
*G06K 9/00* (2006.01)

(52) U.S. Cl.
CPC .... *H04M 1/72569* (2013.01); *G06K 9/00832* (2013.01); *H04M 1/7255* (2013.01); *H04N 7/147* (2013.01)

(58) Field of Classification Search
CPC ......... H04W 4/80; H04W 4/02; H04W 4/021; H04W 4/029; H04W 84/12; H04W 84/18; H04M 1/72522; H04M 1/72533; H04M 2242/14; H04M 2242/18
See application file for complete search history.

(56) References Cited

U.S. PATENT DOCUMENTS

| | | | |
|---|---|---|---|
| 8,621,645 B1 | 12/2013 | Spackman | |
| 9,650,007 B1* | 5/2017 | Snyder | B60R 21/0132 |
| 9,900,315 B2 | 2/2018 | Yusuf et al. | |
| 2006/0286969 A1* | 12/2006 | Talmor | G06F 21/32 455/415 |
| 2016/0144781 A1* | 5/2016 | Kleinert | B60Q 9/00 701/36 |
| 2018/0137263 A1* | 5/2018 | Kurian | G06F 21/84 |
| 2018/0201207 A1* | 7/2018 | Kim | B60K 35/00 |
| 2018/0208208 A1* | 7/2018 | Chen | B60W 40/09 |
| 2018/0215392 A1* | 8/2018 | Kosaka | G05D 1/0061 |
| 2019/0037173 A1* | 1/2019 | Lee | H04W 76/15 |
| 2019/0141136 A1* | 5/2019 | Karnik | H04L 67/125 |
| 2019/0166473 A1* | 5/2019 | Venkatraman | G01C 21/3438 |

FOREIGN PATENT DOCUMENTS

WO    WO-2016116861 A2 *    7/2016    ............ H04W 4/029

* cited by examiner

*Primary Examiner* — Khalid W Shaheed
(74) *Attorney, Agent, or Firm* — Brooks Kushman P.C.

(57) ABSTRACT

A system in a vehicle, comprising a transceiver configured to communicate with one or more mobile devices in a vehicle, wherein the one or more mobile devices are configured to initiate a voice session with a remote phone, one or more sensors configured to collect data indicating a presence of passengers in the vehicle, a controller in communication with the one or more sensors and the transceiver, wherein the controller is configured to determine the presence of passengers in the vehicle utilizing the data indicating the presence of passengers in the vehicle, and send data indicating the presence of passengers in the vehicle to the remote phone.

19 Claims, 4 Drawing Sheets

APPARATUS AND SYSTEM FOR IDENTIFYING OCCUPANTS IN A VEHICLE

TECHNICAL FIELD

The present disclosure relates to identifying occupants in a vehicle.

BACKGROUND

Vehicle computer systems may include transceivers that are configured to communicate with a driver's mobile phone. The driver may utilize the vehicle computer system to handle hands-free communication utilizing vehicle features. For example, the conversation may be output on vehicle speakers and a vehicle mic may be utilized to pick up Other occupants may be in the vehicle when a driver has initiated a voice session.

SUMMARY

According to one embodiment, a system in a vehicle, comprising a transceiver configured to communicate with one or more mobile devices in a vehicle, wherein the one or more mobile devices are configured to initiate a voice session with a remote phone, one or more cameras configured to obtain image information from one or more occupants in the vehicle, a controller in communication with the one or more cameras and the transceiver, wherein the controller is configured to identify one or more occupants in the vehicle utilizing the facial recognition information and send data identifying the one or more occupants in the vehicle to the remote phone.

According to a second embodiment, a system in a vehicle, comprising a transceiver configured to communicate with one or more mobile devices in a vehicle, wherein the one or more mobile devices are configured to initiate a voice session with a remote phone, one or more sensors configured to collect data indicating a presence of passengers in the vehicle, a controller in communication with the one or more sensors and the transceiver, wherein the controller is configured to determine the presence of passengers in the vehicle utilizing the data indicating the presence of passengers in the vehicle, and send data indicating the presence of passengers in the vehicle to the remote phone.

According to a third embodiment, a mobile device, comprising a first transceiver configured to communicate with a remote phone, a second transceiver configured to communicate a vehicle system, a controller in communication with the first and second transceiver, wherein the controller is configured to send an instruction to the vehicle system indicating a voice session with the remote phone and send a notification to the remote phone, wherein the notification indicates a presence of passengers in the vehicle in response to data from the second transceiver indicating the presence of passengers.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
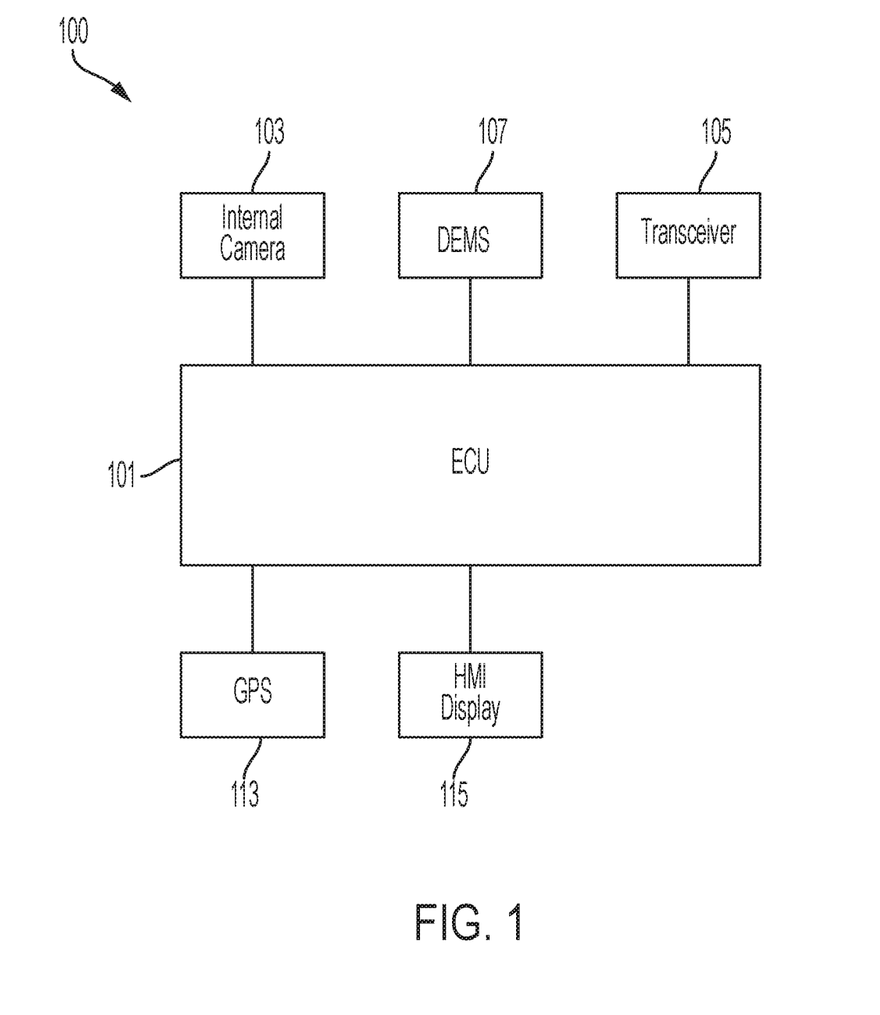
FIG. 1 illustrates an example block diagram of a vehicle system 100.

FIG. 1 illustrates an example block diagram of a vehicle system 100. The system 100 may include a controller 101. The controller 101 may be a vehicle controller such as an electronic control unit (ECU). The controller 101, also referred to herein as ECU 101, may be embodied in a processor configured to carry out instructions for the methods and systems described herein. The controller 101 may include a memory (not individually shown in FIG. 1), as well as other components specific processing within the vehicle. The controller 101 may be one or more computing devices such as a quad core processor for processing commands, such as a computer processor, microprocessor, or any other device, series of devices or other mechanisms capable of performing the operations discussed herein. The memory may store instructions and commands. The instructions may be in the form of software, firmware, computer code, or some combination thereof. The memory may be in any form of one or more data storage devices, such as volatile memory, non-volatile memory, electronic memory, magnetic memory, optical memory, or any other form of data storage device. In one example, the memory may include 2 GB DDR3, as well as other removable memory components such as a 128 GB micro SD card.

The controller 101 may be in communication with various sensors, modules, and vehicle systems both within and remote of a vehicle. The system 100 may include such sensors, such as various cameras, a LIDAR sensor, a radar sensor, an ultrasonic sensor, or other sensor for detecting information about the surroundings of the vehicle, including, for example, other vehicles, lane lines, guard rails, objects in the roadway, buildings, pedestrians, etc. In the example shown in FIG. 1, the system 100 may include an in-cabin monitor system 103, a transceiver 105, a GPS module 113, a human-machine interface (HMI) display as well as other sensors, controllers, and modules. FIG. 1 is an example system and the system 100 may include more or less sensors, and of varying types. Further, while the vehicle of FIG. 1 is shown with specific sensors in specific locations for purposes of illustration, the system 100 may be equipped with additional sensors at different locations within or on the vehicle, including additional sensors of the same or different type. As described below, such sensors may be utilized to determine a cognitive load of an occupant of the vehicle.

The vehicle system 100 may be equipped with a transceiver 105. The transceiver 105 may be a BLUETOOTH transceiver. In one illustrative embodiment, the system 100 uses the BLUETOOTH transceiver 105 to communicate with a user's mobile device (e.g., cell phone, smart phone, PDA, tablet, or any other device having wireless remote network connectivity). The mobile device can then be used to communicate with a network outside the vehicle system 100 through, for example, communication with a cellular tower. In some embodiments, tower may be a WiFi access point. The mobile device could also be used to track the occupants' phone interaction (e.g. web browsing, texting). As discussed below in the other embodiments, the mobile device in the vehicle may communicate with a remote mobile device.

If the user has a data-plan associated with the mobile device, it is possible that the data-plan allows for broad-band transmission and the system could use a much wider bandwidth (speeding up data transfer). In still another embodiment, mobile device is replaced with a cellular communication device (not shown) that is installed to vehicle. In yet another embodiment, the mobile device may be a wireless local area network (LAN) device capable of communication over, for example (and without limitation), an 802.11g network (i.e., WiFi) or a WiMax network. In one embodiment, incoming data can be passed through the mobile device via a data-over-voice or data-plan, through the onboard BLUETOOTH transceiver and into the vehicle's ECU 101. In the case of certain temporary data, for example, the data can be stored on the HDD or other storage media until such time as the data is no longer needed.

In another embodiment, the transceiver 105 may be on on-board communication device or cellular modem. The on-board communication device may not require a cellular phone (e.g. mobile device) to be paired with a BLUETOOTH transceiver to communicate to an off-board server. Instead, the on-board modem may have its own capability to communicate with an off-board network.

In another embodiment, the transceiver 105 may communicate with a mobile device located in the vehicle. The mobile device may include its own transceiver (e.g. long-range transceiver) configured to connect with remote phones or mobile devices via satellites, communication towers or a telephone network. The mobile device may also include a second transceiver (e.g. short-range transceiver) configured to connect with the vehicle system. This may include an integrated Bluetooth transceiver or other communication method to interact with the vehicle. When the mobile device becomes integrated with the vehicle and connected, the mobile device features may be replicated on the vehicle. For example, the vehicle mic may be utilized for phone conversations. Furthermore, the vehicle speakers may be utilized for outputting sound of the phone conversation. The vehicle may also utilize the features of the phone as well. For example, the vehicle system may utilize a camera of the mobile phone to capture images, recordings, or identify occupants in the vehicle. Furthermore, the vehicle system may utilize the mobile phone for an internet or data connection.

An in-cabin monitor system 103 may include a driver status monitoring system (DSM) and an occupant monitoring system (OMS). DSM focused on the primary occupant who making driving maneuver decisions. OMS focused on other occupants who are not involved in driving decisions. Both DSM and OMS may include in-vehicle cameras, which may be utilized to capture images of an occupant in the vehicle. The in-vehicle camera may obtain facial information about an occupant, such as eye-movement of the occupant and head-movement of the occupant, as discussed further below. The in-vehicle camera may be a color camera, infrared camera, or time of flight camera.

A controller may receive driver status data from the DSM to determine an abnormal situation within the vehicle. The DSM employs one or more activity sensors such as a driver-facing camera, a health scanner, and a driver performance evaluator to monitor activities performed by the driver. Based on the activity sensors, the driver status module may determine whether the driver is, for example, distracted, sick, or drowsy as the abnormal situation.

The DSM may be mounted at the meter console to capture the driver's face, especially the driver's eyes. The DSM module or ECU 101 may process data received from the driver-facing camera and monitors whether the driver looks away from the road based on the driver's gaze direction. If the driver looks away, the driver status module or ECU 101 determines the abnormal situation. The driver status module or ECU 101 may also determine whether the driver is drowsy or alert based on how much the driver's eye opens and for how long. In addition, driver status module or ECU 101 may also identify a cognitive load of the user. The driver-facing camera may be utilized for identification of a driver and utilized for possible video conferencing.

A health scanner may be mounted on the steering wheel or suitable location which the driver touches. A health scanner may also use on-contact sensors such as infrared cameras. The health scanner scans physiological features (such as heartbeat, skin conductance level, blood pressure). The DSM module or ECU 101 processes data received from the health scanner and monitors whether the driver is suffering from a severe physical condition or episode, such as a heart attack based on the heartbeat. If the driver is suffering from the serve physical condition or episode, the driver status module determines an abnormal situation.

The health scanner may include multiple sensors utilized to monitor a primary occupant or secondary occupants. The sensors may include primary occupant facing camera that is configured to capture eye movement and a facial expression of the occupant. The sensors may also include a biometric sensor for heart rate, respiration rate, blood pressure, brain activity, skin conductance level, body temperature, etc. via contact-based or non-contact-based sensors. The sensors may include a set of vehicle dynamic sensor, which collect information to assess the quality of driving or the level of maneuver difficulty based on metrics such as speed, acceleration, steering entropy. The other sensors may include whole cabin imaging monitor system to detect and predict the interaction between the primary and other occupants. The sensors may also include audio processing unit to detect and predict the interaction between the primary and other occupants. The multiple sensor includes a set of biometric sensor for heart rate, respiration rate, blood pressure, brain activity, skin conductance level, body temperature, etc. via contact-based or non-contact based sensor. The system may utilize such information to predict the needs for future interaction between the primary and other occupants.

An OMS may be mounted on the ceiling of the vehicle or suitable location could observe user's interaction with other occupants of the car. The occupant monitor evaluates the actual cognitive demands or potential cognitive demands from interacting with other occupants. For example, if the OMS detecting the user is actively caring for the other occupants (e.g., passing food items, play request media), his/her cognitive load may be evaluated as high. In another example, if the OMS detect an underage child has elevated temperature, it may predict the cognitive demand of the user may increase soon.

An in-vehicle camera 104 may be mounted in the vehicle to monitor occupants (e.g. a driver or passenger) within the vehicle cabin. The in-vehicle camera 104 may work with a driver status monitoring system (DSM) to monitor a driver. The in-vehicle camera 104 may be utilized to capture images of an occupant in the vehicle. The in-vehicle camera 104 may obtain facial information about an occupant, such as eye-movement of the occupant and head-movement of the occupant, as discussed further below. The in-vehicle camera may be a color camera, infrared camera, or time of flight camera.

The in-vehicle camera 104 may be mounted at the meter console to capture the driver's face, especially the driver's eyes. The driver status module or ECU 101 may process data received from the camera 104 and monitors change in facial expressions by the occupant. The driver status module or ECU 101 may also work with the in-vehicle camera 104 determine whether the driver is drowsy or alert based on how much the driver's eye opens and for how long.

A driver performance evaluator may assess driver performance based on the vehicle dynamic data, collected either through embedded data source (such as the CAN bus) or installed data source (such as gyroscope, etc.). The driver performance evaluator could be used decide whether a driver is sufficiently focused on the driving task or whether the driver is capable of dealing the current driving environment. The data collected from driver performance data may also be used identify a cognitive load of the user.

The vehicle system 100 may include an external driving environment monitor system (DEMS) 107. The DEMS 107 may include an external camera, which may be mounted in the rear-view mirror. The external camera may also be facing out of the vehicle cabin through a vehicle's windshield to collect imagery data of the environment in front of the vehicle. The external camera may be utilized to collect information and data regarding the front of the vehicle and for monitoring the conditions ahead of the vehicle. The camera may also be used for imaging the conditions ahead of the vehicle and correctly detecting the positions of lane markers as viewed from the position of the camera and the presence/absence, for example, of lighting of the head lights of oncoming vehicles. For example, the external camera may be utilized to generate image data related to vehicle's surrounding the vehicle, lane markings ahead, and other object detection. A vehicle may also be equipped with a rear camera (not shown) for similar circumstances, such as monitoring the vehicle's environment around the rear proximity of the vehicle.

The DEMS 107 could also include other sensors, including the LIDAR sensors, radar sensors, etc. These sensors may be mounted anywhere on the vehicle. For example, it is possible for LIDAR sensors to be mounted on a roof a vehicle with a 360-degree view of the vehicle's surrounding. Furthermore, the various sensors may surround the vehicle to provide a 360-degree view of the vehicle. The vehicle may also be equipped with one or more cameras, one or more LIDAR sensors, one or more radar sensors, one or more ultrasonic sensors, and/or one or more other environmental sensors. Actuators may be utilized to adjust or control an angle of the field of view of the various sensors. Data from these sensors may be processed through DEMS 107 or ECU 101 to identify objects. For example, a forward LIDAR sensor and corner LIDAR sensor may be utilized. The forward LIDAR sensor may be used to determine what vehicle and objects are in the front peripheral of the vehicle. A corner LIDAR sensor may be utilized to also detect and classify objects and used to enhance a vehicle's peripheral view of the vehicle's surrounding. A corner LIDAR sensor may be utilized to also detect and classify objects and used to enhance a vehicle's peripheral view of the vehicle's surrounding.

The forward radar sensor may be mounted in the front bumper of the vehicle. The corner radar sensor may be mounted in the corner of the bumper. Radar sensors may be configured to detect and classify objects to enhance a vehicle's peripheral view of the vehicle's surrounding. The radar sensors may be utilized to help or enhance various vehicle safety systems. The forward radar sensor may be built into a front bumper of the vehicle to determine that an object is ahead of the vehicle. The corner radar sensor may be located in the rear bumper or the side of the vehicle. The corner radar sensor may be utilized to determine if objects are in a driver's blind spot, as well as detecting vehicles or objects approaching from the rear on the left and right when reversing. Such functionality may allow a driver to navigate around other vehicles when changing lanes or reversing out of a parking space, as well as assist in autonomous emergency braking in order to avoid collisions that may be imminent.

The system 100 may also include a global positioning system (GPS) 113 that detects or determines a current position of the vehicle. In some circumstances, the GPS 113 may be utilized to determine a speed that the vehicle is traveling. The system 100 may also include a vehicle speed sensor (not shown) that detects or determines a current speed that the vehicle is traveling. The system 100 may also include a compass or three-dimensional (3D) gyroscope that detects or determines a current direction of the vehicle. Map data may be stored in the memory. The GPS 113 may update the map data. The map data may include information that may be utilized with advanced driver assistance system (ADAS). Such ADAS map data information may include detailed lane information, slope information, road curvature data, lane marking-characteristics, etc. Such ADAS map information may be utilized in addition to traditional map data such as road names, road classification, speed limit information, etc. The controller 101 may utilize data from the GPS 113, as well data/information from the gyroscope, vehicle speed sensor, and map data, to determine whether a location or current position of the vehicle are suitable to use an HMI presentation with a given level of complexity.

The system 100 may also include a human-machine interface (HMI) display 115. The HMI display 115 may include any type of display within a vehicle cabin. Such HMI displays may include a dashboard display, navigation display, multimedia display, heads-up display, thin-film transistor liquid-crystal display (TFT LCD), etc. The HMI display 115 may also be connected to speakers to output sound related to commands or the user interface of the vehicle. The HMI display 115 may be utilized to output various commands or information to occupants (e.g. driver or passengers) within the vehicle. For example, in an automatic braking scenario, the HMI display 115 may display message that the vehicle is prepared to brake and provide feedback to the user regarding the same. The HMI display 115 may utilize any type of monitor or display utilized to display relevant information to the occupants. The HMI display 115 may also include a heads-up display ("HUD") that is utilized to display an interface and other objects on a windshield so that the images are within a driver's periphery while driving.

The center controller panel or a remote controller may be mounted interior of the vehicle to control various vehicle systems. For example, the center controller panel or a remote controller could control an air conditioner, a music player, a video player, and a GPS navigation. The driver status module processes data received from the center controller panel or a remote controller and monitors whether the driver is distracted by non-driving tasks and his/her level of engagement on secondary task. A center controller panel may include a touch screen interface, knobs, buttons and other types of interaction method. A remote controller may be located at the steering wheel, in front of arm rest or other locations that accessible to the user. A remote controller may include touch-pads, knobs, buttons and other types of interaction method. For example, when the center controller panel or a remote controller is being operated as the vehicle is traveling, the driver is involved in secondary tasks that are potentially distracting the driver. If the driver is distracted, the driver status module ECU may determine the abnormal situation.

In addition to providing visual indications, the HMI display 115 may also be configured to serve as the center controller panel, receiving user input via a touch-screen, user interface buttons, etc. The HMI display 115 may be configured to receive user commands indicative of various vehicle controls such as audio-visual controls, autonomous vehicle system controls, certain vehicle features, cabin temperature control, etc. The controller 101 may receive such user input and in turn command a relevant vehicle system of component to perform in accordance with the user input.

The controller 101 can receive information and data from the various vehicle components including the in-cabin monitor system 103, the DEMS 107, the GPS 113 and the HMI display 115. The controller 101 utilize such data to provide vehicle functions that may relate to driver assistance, or autonomous driving. For example, data collected by the in-cabin monitor system 103 and the DEMS 107 may be utilized in context with the GPS data and map data to provide or enhance functionality related to adaptive cruise control, automatic parking, parking assist, automatic emergency braking (AEB), etc. The controller 101 may be in communication with various systems of the vehicle (e.g. the engine, transmission, brakes, steering mechanism, display, sensors, user interface device, etc.). For example, the controller 101 can be configured to send signals to the brakes to slow the vehicle 100, or the steering mechanism to alter the path of vehicle, or the engine or transmission to accelerate or decelerate the vehicle. The controller 101 can be configured to receive input signals from the various vehicle sensors to send output signals to the display device, for example. The controller 101 may also be in communication with one or more databases, memory, the internet, or networks for accessing additional information (e.g. maps, road information, weather, vehicle information). The controller may also be utilized with the in-cabin monitor system 103 to identify facial features of an occupant of the vehicle, as explained in more detail below.

Figure 2:
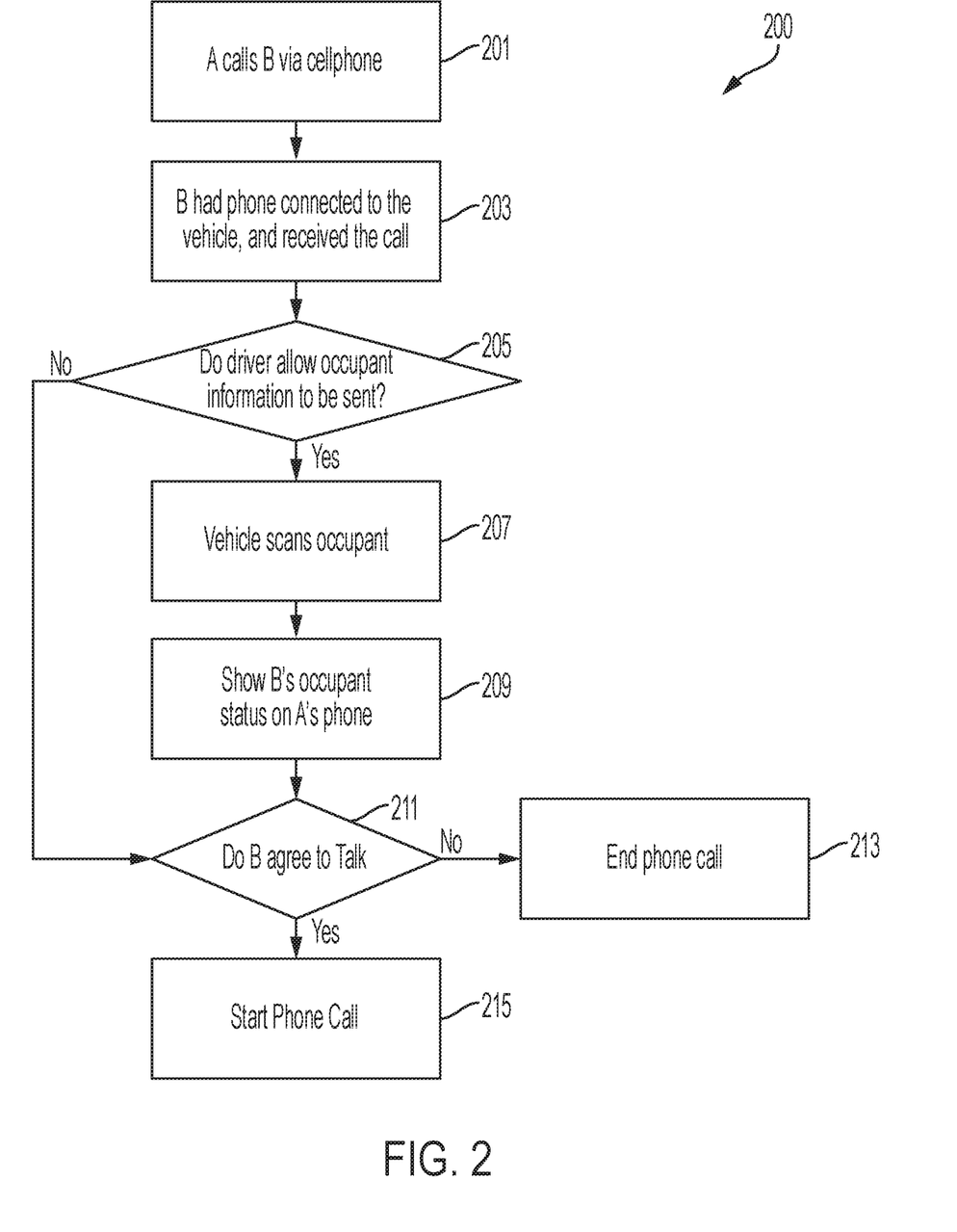
FIG. 2 illustrates an example flow chart 200 of a mobile device in a vehicle.

FIG. 2 illustrates an example flow chart 200 of a mobile device in a vehicle. The vehicle may be in communication with a mobile device via a wireless transceiver such as a Bluetooth transceiver. When the mobile device is in communication with the vehicle via the transceiver, the mobile phone may utilize certain vehicle components.

At step 201, a remote caller (e.g. caller A) may call a vehicle or mobile phone paired with a vehicle (e.g. caller B) via a cellular phone. The scenario may happen in the inverse, that is the vehicle caller (e.g. caller B) may dial a remote caller (e.g. caller A). At step 203, caller B may have their mobile phone connected to the vehicle and receive the call. Of course, the phone does not need to be a mobile device.

At decision 205, the system may analyze whether the driver may allow occupant information to be sent to a remote caller. The mobile phone paired with the vehicle may include a setting to determine whether or not occupant information may be sent to a remote caller (e.g. caller A). In another scenario, a vehicle setting may exist that may determine whether or not occupant information is sent to a remote caller.

At step 207, the system may scan the vehicle for occupant information. When the vehicle is in communication with the mobile device, the system may analyze the status of the vehicle cabin prior to a conversation on the mobile phone. The vehicle may analyze the cabin to determine what occupants, aside from the driver, are in the vehicle. The system may work with various vehicle sensors to determine what occupants are in the vehicle. Upon a phone conversation being initiated, the system may communicate with other sensors to determine if other occupants in the car. Such sensors may include a weight sensor located in a seat, seat belt monitor to determine if a seat belt has been fastened, cameras that can identify occupants based on facial recognition or identify that occupants are in the vehicle, infrared sensors that can determine that occupants are located in the car, etc. The system may gather and aggregate such information to later share with the remote mobile device to allow a remote caller that an occupant is present. The vehicle sensors may include an internal camera inside the vehicle (including that of a mobile phone), seat sensors (e.g. identify if a certain weight threshold exceeds on a seat), seat-belt sensors (e.g. seatbelt is connected), biometric scanners (e.g. thermal temperature of an occupant), RFID detector, radar sensor, etc. The sensor may be capable of identifying the number of occupants, the age of the occupants, or may identify the occupant using facial recognition.

At step 209, the system may show the occupant status of the vehicle (e.g. caller B) on the remote caller's phone (e.g. caller A). As shown in detail of FIG. 4, the display may show a number of occupants of the icon or an age or demographic of the occupants. The occupant information may be sent from the vehicle to the remote caller's phone prior to initiating the conversation. That is, data may be sent to the phone immediately after the vehicle scans the occupants for cabins.

At decision 211, the system may determine if the vehicle caller (e.g. caller B) agrees to talk to the remote caller (e.g. vehicle A). If the vehicle caller (e.g. caller B) decides to ignore the call, it may end the phone call at step 213. The vehicle may include settings that allows the user to end the phone call utilizing an interface on the vehicle. Furthermore, the user may also end the call utilizing the phone interface.

At step 215, the system may start the phone call if the users agree that the conversation is initiated. The conversation may be initiated by an interface button on the vehicle or mobile phone if the remote caller's phone (e.g. caller A) initiates the conversation. The conversation may be initiated on an interface button on the remote phone/mobile device is the phone call is initiated by the vehicle caller (e.g. caller B).

When a conversation is initiated, the mobile device may receive information that a phone call has begun. The screen interface for the mobile device may change from showing an interface that an outgoing call has been initiated, to an interface indicating that a recipient has picked up and started a phone call. The vehicle system may be notified of this transition that a phone conversation has taken place and as such, update the HMI of the displays in the vehicle. The system may then determine if the conversation has ended. If that is the case, the operation will end and the interface will change.

Figure 3:
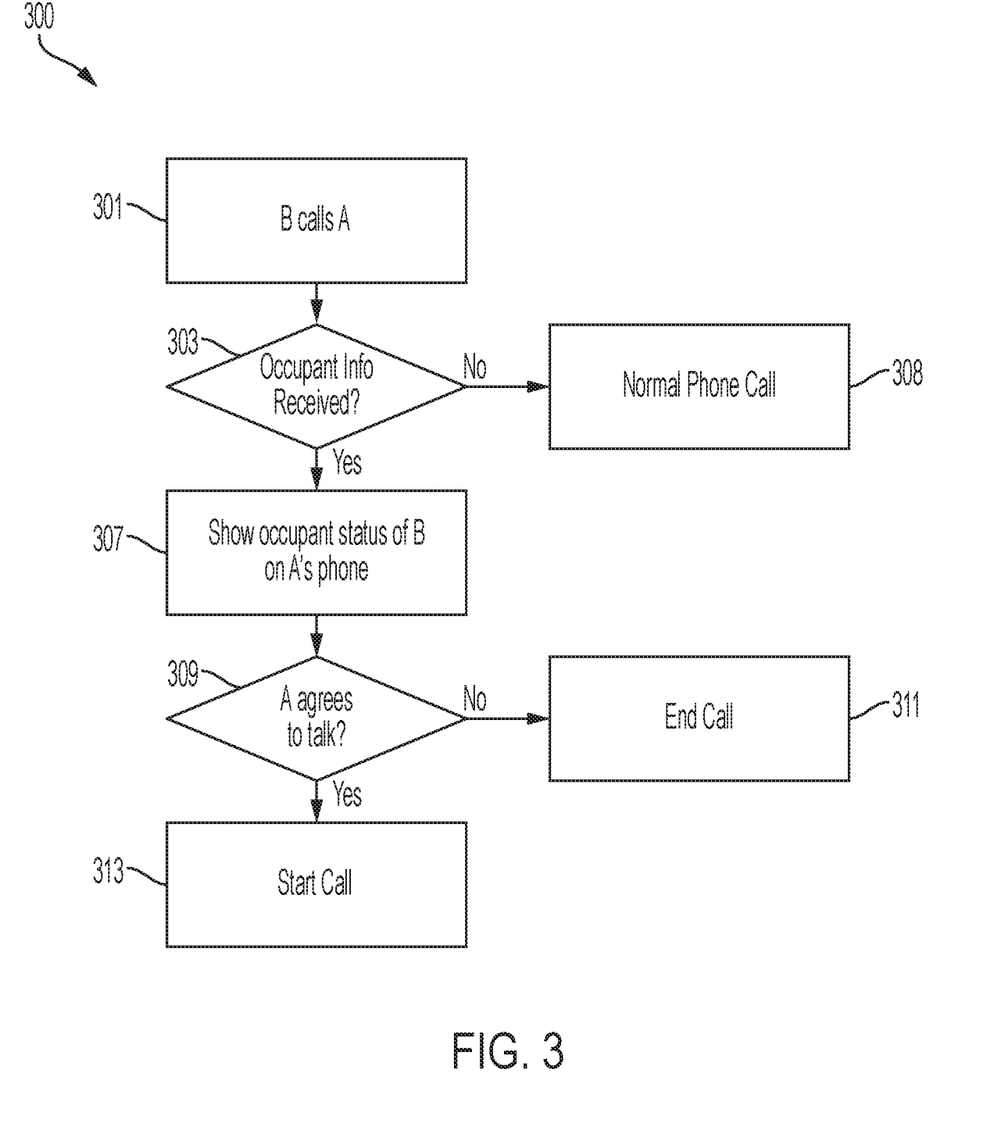
FIG. 3 illustrates an example flow chart 300 of a remote mobile device in communication with a mobile device in a vehicle.

FIG. 3 illustrates an example flow chart of a remote phone in communication with a vehicle. The flow chart 300 may be implemented on the remote phone. The remote phone may be in communication with a mobile device in a vehicle or a dedicated phone system in a vehicle. The remote mobile device may first either receive a phone call or dial out a phone call.

At step 301, a vehicle caller (e.g. caller B) may call a remote caller on the remote caller's mobile phone (e.g. caller A). The scenario may happen in the inverse, that is the remote caller (e.g. caller A) may dial a vehicle caller (e.g. caller B). Of course, the phone does not need to be a mobile device.

At decision 303, the system may determine if the mobile phone received occupant information from the vehicle. The system will utilize the information collected at the vehicle (e.g step 207 above to determine) to determine whether such occupant information was received at the remote mobile phone and whether the occupants (other than the caller) are in the car. If there is no information received, then the system may proceed as normal in step 305. However, if the system determines that other occupants are in the car, the system will proceed to notify the remote caller that other occupants are in the car as shown in step 307. In step 307, the remote mobile device may receive information that there are occupants in the car and display such information on a display of the mobile device. The system may also provide information if there are no other occupants in the car. The system will collect the relevant data and send information to the remote caller to identify the user. The system may send data to a remote caller that will notify the remote caller that an occupant is in the vehicle. Such data may be received at the remote phone and be displayed on an interface of the remote phone at step 307. For example, an icon may be output that indicates the presence of occupants in the vehicle. In another embodiment, an icon may be output that indicates the number of occupant's present. In yet another embodiment, an icon may be output on the remote mobile device that indicates the number off occupants in the vehicle. In other embodiments, a real-time image, contact information, or real-time video may be sent to the remote phone to allow the caller to be notified of others in the vehicle. Such an interface may be exemplified in the embodiment of FIG. 4 below.

Thus, at step 307, the system may show the occupant status of the vehicle (e.g. caller B) on the remote caller's phone (e.g. caller A). As shown in detail of FIG. 4, the display may show a number of occupants of the icon or an age or demographic of the occupants. The occupant information may be sent from the vehicle to the remote caller's phone prior to initiating the conversation. That is, data may be sent to the phone immediately after the vehicle scans the occupants for cabins. Thus, the information regarding occupant status may be shown on the remote mobile phones display prior to initiating the conversation or after initiating the conversation.

At decision 309, the system may determine if the remote caller (e.g. caller A) agrees to talk to the vehicle caller (e.g. vehicle B). If the vehicle caller (e.g. caller B) decides to ignore the call, it may end the phone call at step 313. The vehicle may include settings that allows the user to end the phone call utilizing an interface on the vehicle. Furthermore, the user may also end the call utilizing the phone interface.

At step 313, the system may start the phone call if the users agree that the conversation is initiated. The conversation may be initiated by an interface button on the vehicle or mobile phone if the remote caller's phone (e.g. caller A) initiates the conversation. The conversation may be initiated on an interface button on the remote phone/mobile device is the phone call is initiated by the vehicle caller (e.g. caller B).

When a conversation is initiated, the mobile device may receive information that a phone call has begun. The screen interface for the remote mobile device may change from showing an interface that an outgoing call has been initiated, to an interface indicating that a recipient has picked up and started a phone call. The system may then determine if the conversation has ended. If that is the case, the operation will end, and the interface will change.

Figure 4:
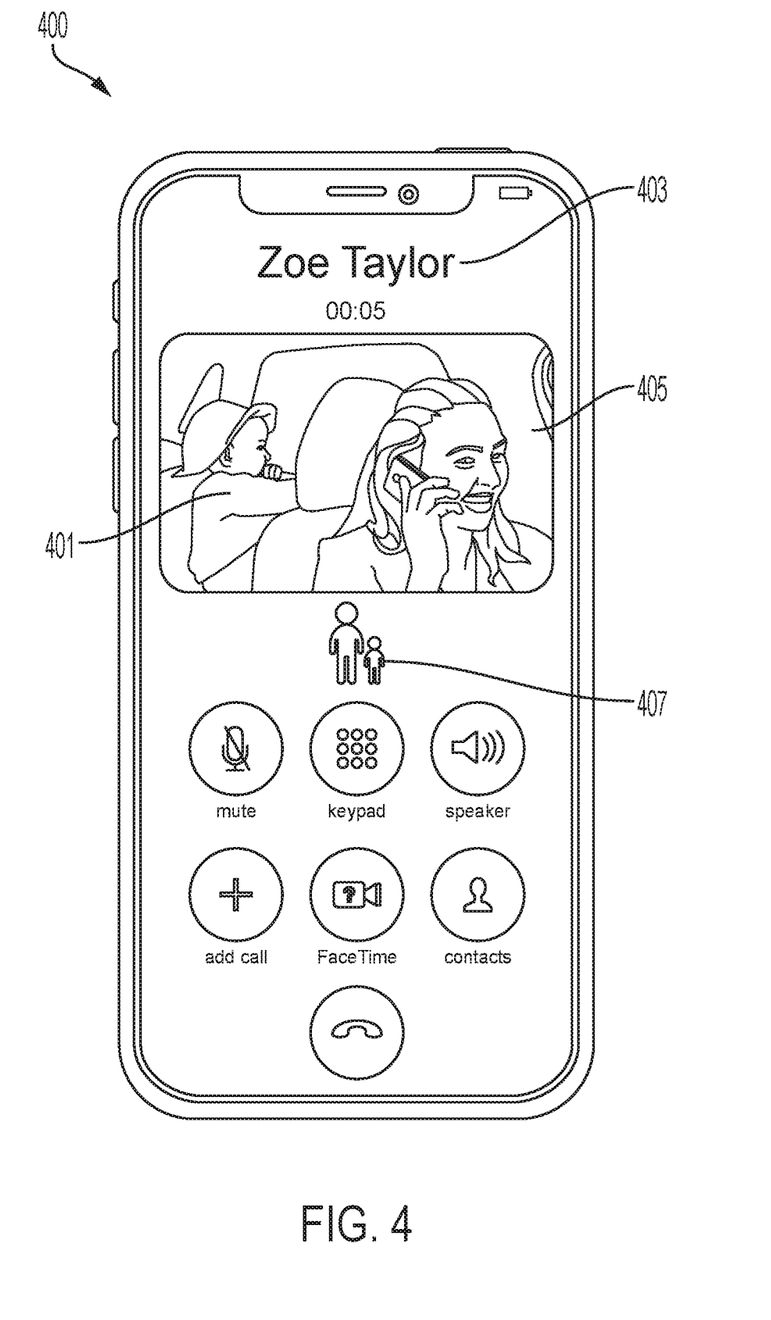
FIG. 4 is an example interface on a mobile phone 400.

FIG. 4 is an example interface on a mobile phone. The mobile phone 400 may include a screen display 401 with an associated interface. The interface may change depending on the phone being having a current call. When the phone is having a conversation, the interface may change and show information related to the phone call. Such information may include caller identification information 403 (e.g. caller name, caller number, etc.), duration of the call, etc. When the vehicle system identifies an occupant in the vehicle, the system may send an image of the vehicle cabin in one embodiment. In another embodiment, the vehicle system may send data indicating the presence of children or adults in the vehicle to the remote mobile device. The remote mobile device may display an icon 407 to identify the occupants in the vehicle. The icons 407 may have a symbol for a child if a child is identified in the vehicle or an adult if adults are in the vehicle. Another icon 407 may display a symbol for an adult if an adult is identified. Other icons may be utilized to identify the presence of those in the vehicle. For example, the user interface can identify a name of the occupants, an image of the occupant, real-time video or images of the occupants, and other information to the remote caller. As shown in 405, the system may display an image or real-time video of the callers in the vehicle. As discussed above, the vehicle system may be able to identify one or more occupants in the car, as well as identify whether the occupant is a child or an adult.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system in a vehicle, comprising:
a transceiver configured to communicate with one or more mobile devices in a vehicle, wherein the one or more mobile devices are configured to initiate a phone conversation with a remote phone;
one or more cameras configured to obtain image information from one or more occupants in the vehicle;
a controller in communication with the one or more cameras and the transceiver, wherein the controller is configured to:
identify one or more occupants in the vehicle utilizing the image information;
and send data identifying the one or more occupants in the vehicle to the remote phone to output an icon to indicate a presence of passengers in the vehicle, in response to initiation of the phone conversation with the remote phone.

2. The system of claim 1, wherein the data identifying the one or more occupants indicates a contact name of the one or more occupants in the vehicle.

3. The system of claim 1, wherein the system further includes one or more seat sensors configured to determine when occupants are in the vehicle.

4. The system of claim 3, wherein the controller is further configured to send data indicating occupants in the vehicle.

5. The system of claim 4, wherein the data indicating occupants in the vehicle include a number of occupants in the vehicle.

6. The system of claim 1, wherein the data identifying the one or more occupants indicates an image of the one or more occupants in the vehicle.

7. The system of claim 1, wherein the controller is configured to send the data identifying the one or more occupants in the vehicle in response to initiation of the phone conversation with the remote phone.

8. A system in a vehicle, comprising:
a transceiver configured to communicate with one or more mobile devices in a vehicle, wherein the one or more mobile devices are configured to initiate a phone conversation with a remote phone;
one or more sensors configured to collect data indicating a presence of passengers in the vehicle;
a controller in communication with the one or more sensors and the transceiver, wherein the controller is configured to:
determine the presence of passengers in the vehicle utilizing the data indicating the presence of passengers in the vehicle; and
send data indicating the presence of passengers in the vehicle to the remote phone, by outputting an icon to indicate a presence of passengers in the vehicle, in response to initiation of the phone conversation with the remote phone.

9. The system of claim 8, wherein the controller is further configured to identify a number of passengers in the vehicle in response to the data indicating the presence of passengers in the vehicle.

10. The system of claim 8, wherein the controller is further configured to identify one or more minor passengers in the vehicle in response to the data indicating the presence of passengers in the vehicle.

11. The system of claim 8, wherein the controller is further configured to identify a number of passengers in the vehicle in response to the data indicating the presence of passengers in the vehicle.

12. The system of claim 8, wherein the controller is further configured to identify one or more minor passengers in the vehicle in response to the data indicating the presence of passengers in the vehicle.

13. The system of claim 12, wherein the system further includes one or more seat sensors determining that additional occupants are in the vehicle.

14. The system of claim 13, wherein the one or more sensors includes a seat sensor.

15. The system of claim 8, wherein the controller is further configured to send instructions to the mobile device to output an audible message indicating the presence of passengers in the vehicle upon initiating the phone conversation.

16. The system of claim 8, wherein the controller is configured to send the data indicating the presence of passengers in the vehicle prior to initiation of the phone conversation with the remote phone.

17. A mobile device, comprising:
a first transceiver configured to communicate with a remote phone;
a second transceiver configured to communicate a vehicle system;
a display; and
a controller in communication with the first and second transceiver, wherein the controller is configured to:
send an instruction to the vehicle system indicating a phone conversation with the remote phone; and
send a notification to the remote phone, wherein the notification is sent to the remote phone in response to initiation of the phone conversation, wherein the notification indicates a presence of passengers in the vehicle in response to data from the second transceiver indicating the presence of passengers; and
output on the display an icon indicating the presence of passengers.

18. The mobile device of claim 17, wherein the mobile device further includes a camera configured to identify the presence of passengers in the vehicle.

19. The mobile device of claim 17, wherein the mobile device further includes a display configured to output video of passengers in the vehicle.

* * * * *